United States Patent
Seok

(10) Patent No.: US 10,211,890 B2
(45) Date of Patent: Feb. 19, 2019

(54) METHOD AND DEVICE FOR TRANSFERRING DATA FROM WIRELESS LAN TO PLURALITY OF STAS

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/101,375

(22) PCT Filed: Jun. 19, 2014

(86) PCT No.: PCT/KR2014/005411
§ 371 (c)(1),
(2) Date: Jun. 2, 2016

(87) PCT Pub. No.: WO2015/088116
PCT Pub. Date: Jun. 18, 2015

(65) Prior Publication Data
US 2016/0301451 A1 Oct. 13, 2016

Related U.S. Application Data

(60) Provisional application No. 61/916,296, filed on Dec. 16, 2013, provisional application No. 61/916,191, filed on Dec. 14, 2013.

(51) Int. Cl.
*H04H 20/71* (2008.01)
*H04B 7/0413* (2017.01)
(Continued)

(52) U.S. Cl.
CPC ......... *H04B 7/0413* (2013.01); *H04L 5/0044* (2013.01); *H04W 4/06* (2013.01);
(Continued)

(58) Field of Classification Search
CPC . H04B 7/0413; H04B 7/0684; H04W 72/005; H04W 4/006; H04W 56/00;
(Continued)

(56) References Cited

U.S. PATENT DOCUMENTS

2009/0196372 A1* 8/2009 Zhang ............... H04B 7/0417
375/267
2011/0317674 A1 12/2011 Park et al.
(Continued)

FOREIGN PATENT DOCUMENTS

| CN | 102511131 | 6/2012 |
|---|---|---|
| EP | 2782274 | 9/2014 |

(Continued)

OTHER PUBLICATIONS

PCT International Application No. PCT/KR2014/005411, International Search Report dated Sep. 25, 2014 2 pages.
(Continued)

*Primary Examiner* — Rebecca E Song
(74) *Attorney, Agent, or Firm* — Lee Hong Degerman Kang Waimey

(57) ABSTRACT

Disclosed are a method and a device for transferring data from a wireless LAN to a plurality of stations (STAs). The method for transferring data from a wireless LAN to a plurality of STAs may comprise: a step in which an AP generates a MIMOOFDMA format PPDU; and a step in the AP transfers the MIMO-OFDMA format PPDU to the plurality of STAs, wherein the MIMO-OFDMA format PPDU comprises a plurality of sub-channel format PPDUs which are synchronized in time phase, and the plurality of sub-channel format PPDUs are transferred respectively to the plurality of STAs through a plurality of respective sub-channel bands, and the number of training fields for the (Continued)

MIMO transfer which are included in the respective plurality of subchannel format PPDUs can be the same.

10 Claims, 12 Drawing Sheets

(51) Int. Cl.
*H04W 56/00* (2009.01)
*H04L 5/00* (2006.01)
*H04W 4/06* (2009.01)
*H04W 72/00* (2009.01)
*H04L 27/26* (2006.01)
*H04W 84/12* (2009.01)
*H04B 7/06* (2006.01)

(52) U.S. Cl.
CPC ......... *H04W 56/00* (2013.01); *H04W 72/005* (2013.01); *H04B 7/0684* (2013.01); *H04L 5/001* (2013.01); *H04L 5/0023* (2013.01); *H04L 5/0053* (2013.01); *H04L 27/2602* (2013.01); *H04L 27/2613* (2013.01); *H04W 84/12* (2013.01)

(58) Field of Classification Search
CPC .... H04W 84/12; H04L 5/0044; H04L 5/0053; H04L 5/0023; H04L 5/001
See application file for complete search history.

(56) References Cited

U.S. PATENT DOCUMENTS

| | | | | |
|---|---|---|---|---|
| 2012/0263090 | A1* | 10/2012 | Porat | H04L 1/0003 370/312 |
| 2012/0327915 | A1 | 12/2012 | Kang et al. | |
| 2013/0286959 | A1* | 10/2013 | Lou | H04W 72/04 370/329 |
| 2014/0307650 | A1* | 10/2014 | Vermani | H04L 5/0044 370/329 |
| 2014/0328242 | A1* | 11/2014 | Tong | H04W 48/00 370/312 |
| 2016/0087766 | A1* | 3/2016 | Sun | H04L 5/0007 370/329 |
| 2016/0301451 | A1* | 10/2016 | Seok | H04W 56/00 |

FOREIGN PATENT DOCUMENTS

| | | |
|---|---|---|
| JP | 2016519909 | 7/2016 |
| KR | 1020090124881 | 12/2009 |
| RU | 2380834 | 1/2010 |
| WO | 2006065690 | 6/2006 |
| WO | 2011099087 | 8/2011 |
| WO | 2011099687 | 8/2011 |
| WO | 2011108832 | 9/2011 |
| WO | 2012026779 | 3/2012 |
| WO | 2013103543 | 7/2013 |
| WO | 2013162279 | 10/2013 |
| WO | 2014193547 | 12/2014 |
| WO | 2013073921 | 7/2017 |

OTHER PUBLICATIONS

Broadcom Corporation, "Limitations on WLAN measurements for WLAN/3GPP Radio Interworking", R2-132461, 3GPP TSG-RAN WG2 Meeting #83, Aug. 2013, 8 pages.
Japan Patent Office Application No. 2016-539092, Office Action dated Apr. 18, 2017, 3 pages.
Shinohara, et al., "Capacity Enhancement with Multi-User Multi-Channel Transmission Technique for WLANs", RCS2013-117, Jul. 2013, 6 pages.
Russian Federation Federal Service for Intellectual Property, Patents and Trademarks Application Serial No. 2016128040/07, Office Action dated Apr. 7, 2017, 12 pages.
IP Australia Application Serial No. 2014362047 Office Action dated Jun. 5, 2017, 7 pages.
"IEEE P802.11ah™/D0.1 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation", 802.11 Working Group of the LAN/MAN Standards Committee of the IEEE Computer Society, IEEE, May 2013, 327 pages.
European Patent Office Application Serial No. 14869971.3, Search Report dated Jul. 28, 2017, 10 pages.
The State Intellectual Property Office of the People's Republic of China Application Serial No. 201480068885.7, Office Action dated Sep. 9, 2017, 9 pages.

* cited by examiner

METHOD AND DEVICE FOR TRANSFERRING DATA FROM WIRELESS LAN TO PLURALITY OF STAS

CROSS-REFERENCE TO RELATED APPLICATIONS

This application is the National Stage filing under 35 U.S.C. 371 of International Application No. PCT/KR2014/005411, filed on Jun. 19, 2014, which claims the benefit of U.S. Provisional Application No. 61/916,191, filed on Dec. 14, 2013 and 61/916,296, filed on Dec. 16, 2013, the contents of which are all hereby incorporated by reference herein in their entirety.

BACKGROUND OF THE INVENTION

Field of the Invention

The present invention relates to wireless communications, and more particularly, to a method and apparatus for transmitting data to a plurality of terminals in a wireless local area network (WLAN).

Related Art

A Wireless Next Generation Standing Committee (WING SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

High efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention proposes a method of transmitting data to a plurality of terminals in a wireless local area network (WLAN).

The present invention also provides an apparatus for transmitting data to a plurality of terminals in a WLAN.

In order to accomplish the object of the present invention, according to an aspect of the present invention, there is provided, a method of transmitting data to a plurality of stations (STAs) in a WLAN. The method may include generating, by an access point (AP), multiple input multiple output (MIMO)-orthogonal frequency division multiple access (OFDMA) format physical layer convergence procedure (PLCP) protocol data unit (PPDU), and transmitting, by the AP, the MIMO-OFDMA format PPDU to the plurality of STAs. The MIMO-OFDMA format PPDU may include a plurality of sub-channel format PPDUs which are time synchronized. The plurality of sub-channel format PPDUs may be transmitted respectively to the plurality of STAs respectively through a plurality of sub-channel bands. The number of training fields for MIMO transmission and included respectively in the plurality of sub-channel format PPDUs may be identical.

In order to accomplish the object of the present invention, according to another aspect of the present invention, there is provided an AP for transmitting data to a plurality of STAs in a WLAN. The AP may include a radio frequency (RF) unit configured to transmit or receive a radio signal, and a processor selectively coupled to the RF unit. The processor may be configured to generate MIMO-OFDMA format PPDU, and transmit the MIMO-OFDMA format PPDU to the plurality of STAs. The MIMO-OFDMA format PPDU may include a plurality of sub-channel format PPDUs which are time synchronized. The plurality of sub-channel format PPDUs may be transmitted respectively to the plurality of STAs respectively through a plurality of sub-channel bands. The number of training fields for MIMO transmission and included respectively in the plurality of sub-channel format PPDUs may be identical.

According to a data transmission method based on multiple input multiple output (MIMO)-orthogonal frequency division multiplexing access (OFDMA), efficiency of a medium access control (MAC) layer and/or physical (PHY) layer can be increased in an institute of electrical and electronics engineers (IEEE) 802.11 wireless local area network (LAN), and a data throughput and a frequency efficiency can be increased.

DESCRIPTION OF EXEMPLARY EMBODIMENTS

Figure 1:
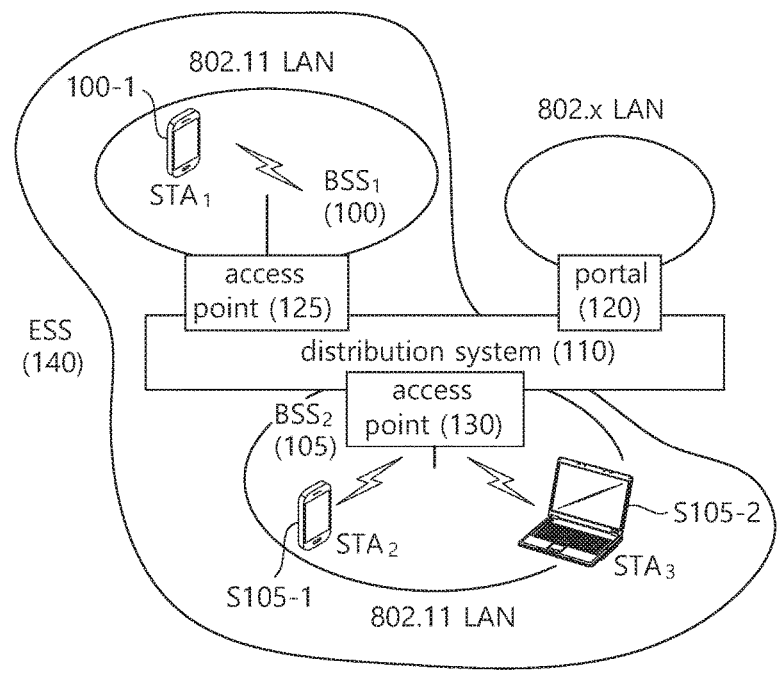
FIG. 1 is a concept view illustrating the structure of a wireless local area network (WLAN).
Figure 1:
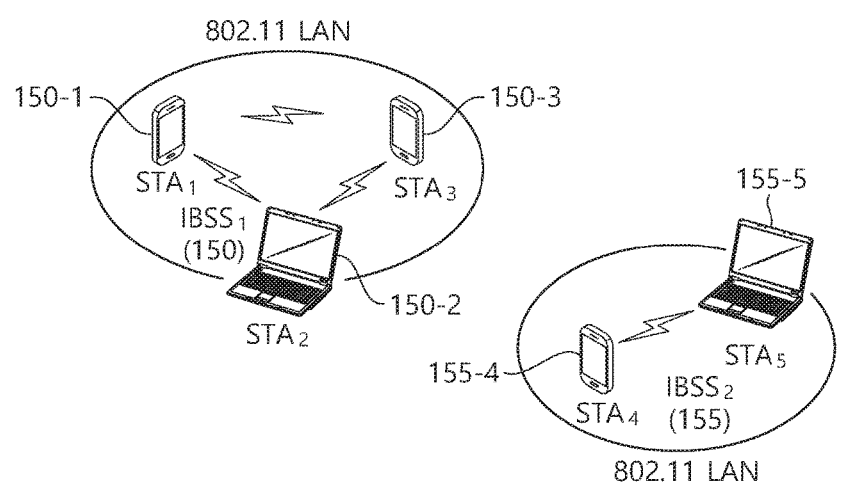

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
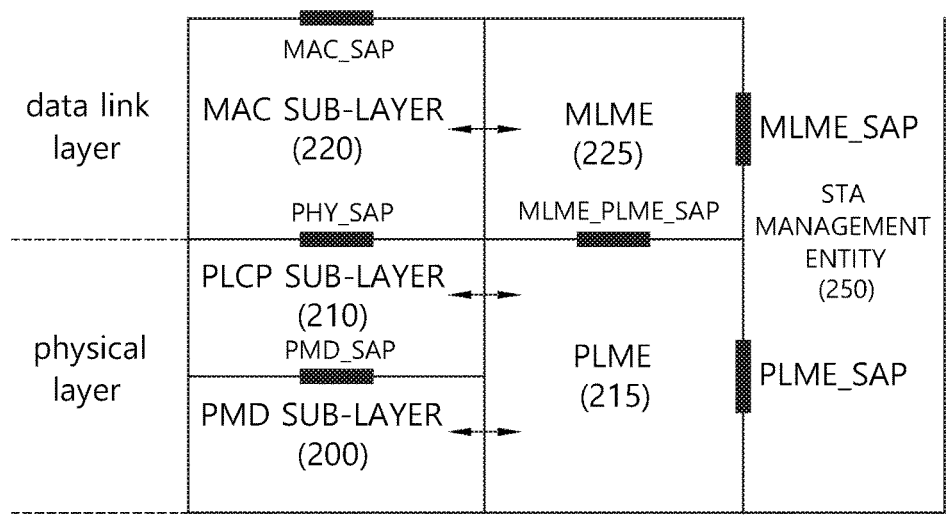
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200

A terminal supporting the IEEE 802.11a standard may have a transfer rate of up to 54 Mbps when data is transmitted through a 20 MHz channel band at a 5 GHz frequency band on the basis of orthogonal frequency division multiplexing (OFDM).

A terminal supporting the IEEE 802.11n standard may have a transfer rate of up to 600 Mbps when data is transmitted through a 20 MHz or 40 MHz channel bandwidth at a 2.4 GHz or 5 GHz frequency band on the basis of multiple input multiple output (MIMO).

The IEEE 802.11ac standard aims to provide a throughput greater than or equal to 1 Gbps in a medium access control (MAC) service access point (SAP) layer. A wireless local area network (WLAN) system supporting the IEEE 802.11ac standard may also be referred to as a very high throughput (VHT) system. For the throughput greater than or equal to 1 Gbps in the MAC SAP layer, the VHT system may support an 80/160 MHz channel band and 8 spatial streams (or space time streams). If the VHT system supports the 160 MHz channel bandwidth, up to 8 spatial streams, 256 quadrature amplitude modulation (QAM), and a short Guard Interval (GI), then the terminal supporting the VHT system may have a transfer rate of up to 6.9 Gbps when data is transmitted in a physical layer.

In order to satisfy the aforementioned throughput, a plurality of VHT STAs supporting the VHT system may transmit and receive data through the same channel simultaneously when communicating with an access point (AP). A VHT AP may transmit data simultaneously to the plurality of VHT STAs on the basis of space division multiple access (SDMA) or multiple user (MU)-MIMO. That is, data may be transmitted or received simultaneously between the plurality of VHT STAs and the VHT AP.

With the increase in a demand for high-definition multimedia transmission at present, an unlicensed frequency band is on an increasing trend. Further, it is not easy to ensure a contiguous 160 MHz channel bandwidth in the IEEE 802.11ac due to a channel bandwidth used by the legacy WLAN standard. Therefore, in the IEEE 802.11ac, a 160 MHz channel bandwidth in which non-contiguous channels are aggregated may be used.

Hereinafter, a transmission method based on multiple input multiple output (MIMO)-orthogonal frequency division multiplexing access (OFDMA) for increasing efficiency of a MAC layer and/or a PHY layer in a WLAN is disclosed according to an embodiment of the present invention.

For example, a 20 MHz channel band may be allocated for each of STAs for MIMO-OFDMA transmission in a WLAN. That is, if an AP transmits data to the plurality of STAs through MIMO-OFDMA transmission, each of the plurality of STAs may simultaneously transmit data to the AP through the 20 MHz channel band allocated thereto.

A channel band allocated for each of the plurality of STAs in the entire channel band used for MIMO-OFDMA transmission may be expressed by the term 'sub-channel band'. If the 20 MHz channel band is allocated to each of the plurality of STAs in the entire 80 MHz channel band for the MIMO-OFDMA transmission, the 20 MHz channel band may be a sub-channel band.

Figure 3:
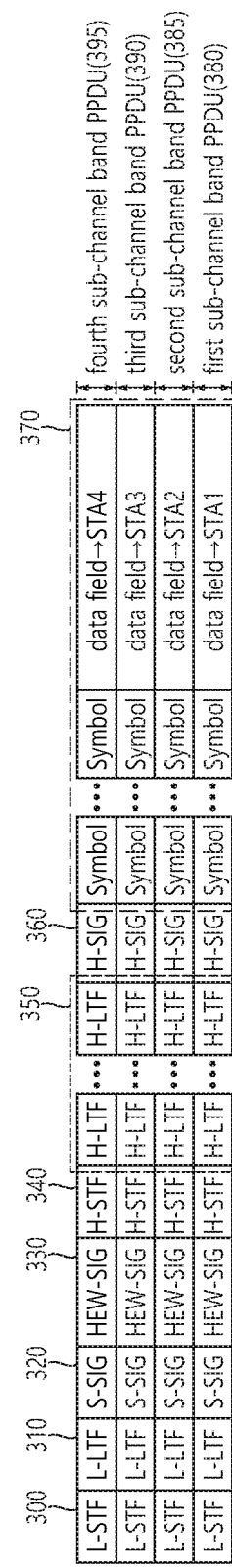
FIG. 3 is a concept view illustrating a physical layer convergence procedure (PLCP) protocol data unit (PPDU) supporting multiple input multiple output (MIMO)-orthogo

FIG. 3 is a concept view illustrating a PPDU supporting MIMO-OFDMA transmission according to an embodiment of the present invention.

Referring to FIG. 3, the PPDU supporting MIMO-OFDMA transmission may include a legacy part, an HEW part, and a data field. Hereinafter, the PPDU supporting MIMO-OFDMA transmission may be expressed by the term 'MIMO-OFDMA format PPDU'.

The legacy part may include a legacy (L)-short training field (STF) 300, an L-long training field (LTF) 310, and an L-signal (SIG) 320. The HEW part may include an HEW-SIG 330, an H-STF 340, an H-LTF 350, and an H-SIG 360.

The L-STF 300, the L-LTF 310, and the L-SIG 320 may be transmitted for backward compatibility with the legacy STA supporting IEEE 802.11g/n/ac.

The L-STF 300 may include a short training orthogonal frequency division multiplexing (OFDM) symbol. The L-STF 300 may be used for frame detection, automatic gain control (AGC), diversity detection, and coarse frequency/time synchronization.

The L-LTF 310 may include a long training OFDM symbol. The L-LTE 310 may be used for fine frequency/time synchronization and channel prediction.

The L-SIG 320 may be used to transmit control information. The L-SIG 320 may include information for a data rate and a data length.

The L-SIG 320 may deliver information regarding a transmission duration of a PSDU included in the MIMO-OFDMA format PPDU to protect the PSDU from the legacy STA.

The HEW-SIG 330 may include information for reception of the PSDU included in the MIMO-OFDMA format PPDU. For example, the HEW-SIG 330 may include information regarding OFDMA user group assignment, information regarding sub-channel assignment, and information regarding spatial stream assignment.

The high efficiency short training field (H-STF) 340 may be used for frequency offset estimation and phase offset estimation for decoding the PSDU included in the MIMO-OFDMA format PPDU.

The high efficiency long training field (H-LTF) 350 may be used for MIMO channel estimation for decoding the PSDU included in the MIMO-OFDMA format PPDU. A method of determining the number of H-LTFs 350 included in the MIMO-OFDMA format PPDU is described below in detail.

Table 1 below shows the number of H-LTFs 350 included in the MIMO-OFDMA format PPDU according to N_{STS, total}, that is, the total number of spatial streams.

TABLE 1

| N_{STS, total} | Number of H-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to Table 1, when the number of spatial streams transmitted on the basis of MIMO-OFDMA is 1, 2, 3, 4, 5, 6, 7, and 8, the numbers of required H-LTFs respectively correspond to 1, 2, 4, 4, 6, 6, 8, and 8.

The H-SIG 360 transmitted after the H-LTFs 350 may include user specific information (individual information for each STA) for a PSDU transmitted through each subframe. For example, the H-SIG 360 may include information regarding a modulation and coding scheme (MCS), a guard interval (GI), a PSDU length, or the like for performing decoding on the PSDU in each STA. The term 'signal field' may be used to indicate the HEW-SIG 330 and/or the H-SIG 360. The HEW-SIG 330 and the H-SIG 360 may be described below in detail.

In FIG. 3, an MIMO-OFDMA format PPDU is disclosed for a case where an AP performs data transmission for an STA1, an STA2, an STA3, and an STA4 through respective 20 MHz sub-channel bands. The MIMO-OFDMA format PPDU may be a set of PPDUs transmitted through each sub-channel. Hereinafter, a PPDU transmitted through each sub-channel is expressed by the term 'sub-channel format PPDU' in the embodiment of the present invention. A plurality of sub-channel format PPDUs may be time-synchronized to construct the MIMO-OFDMA format PPDU.

The AP may transmit a first sub-channel format PPDU 380 to the STA1 by using one spatial stream in a first sub-channel band.

The AP may transmit a second sub-channel format PPDU 385 to the STA2 by using two spatial streams in a second sub-channel band.

The AP may transmit a third sub-channel format PPDU 390 to the STA3 by using three spatial streams in a third sub-channel band.

The AP may transmit a fourth sub-channel format PPDU 395 to the STA4 by using four spatial streams in a fourth sub-channel band.

The first sub-channel format PPDU 380 to the fourth sub-channel format PPDU 395 may be time-synchronized to construct the MIMO-OFDMA format PPDU.

The AP may divide an 80 MHz channel bandwidth into four 20 MHz channel bandwidths, and may transmit the sub-channel format PPDU to each STA through each 20 MHz channel bandwidth. Alternatively, the AP may transmit the sub-channel format PPDUs respectively to the STA2, the STA3, and the STA4 by using a plurality of spatial streams. The number of H-LTFs 350 included in the legacy PPDU may be determined on the basis of the number of spatial streams transmitted by the AP. According to the embodiment of the present invention, a transmission duration of up to a previous frame of a data field (or PSDU) 370 may be set identically in the MIMO-OFDMA format PPDU. Therefore, the number of H-LTFs 350 included in the sub-channel format PPDU constituting the MIMO-OFDMA format PPDU transmitted through each sub-channel band may be set identically. That is, the number of H-LTFs 350 included in the sub-channel format PPDU may be different from the number of spatial streams transmitted through the sub-channel band from the AP. A method of setting the number of H-LTFs 350 included in the sub-channel format PPDU is described below.

In FIG. 3, a guard interval used for the PSDU transmitted through each sub-channel may have the same size.

Figure 4:
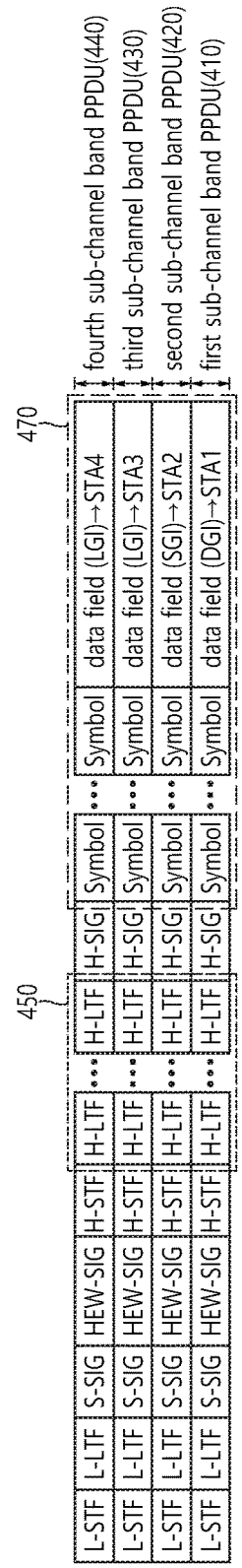
- FIG. 4 is a concept view illustrating a PPDU for MIMO-OFDMA according to an embodiment of the present invention.

FIG. 4 is a concept view illustrating a PPDU for MIMO-OFDMA according to an embodiment of the present invention.

Referring to FIG. 4, it is shown a case where an AP allocates a 20 MHz sub-channel band for each of an STA1, an STA2, an STA3, and an STA4. A case where a GI for transmitting a data field (or PSDU) 400 transmitted through each 20 MHz sub-channel band is different is disclosed in FIG. 4.

The AP transmits a first sub-channel format PPDU 410 to the STA1 through a first sub-channel band. A GI for transmission of the data field of the first sub-channel format PPDU may be a double GI.

The AP transmits a second sub-channel format PPDU 420 to the STA2 through a second sub-channel band. A GI for transmission of the data field of the second sub-channel format PPDU 420 may be a short GI.

The AP transmits a third sub-channel format PPDU 430 to the STA3 through a third sub-channel band. A GI for transmission of the data field of the third sub-channel format PPDU 430 may be a long GI.

The AP transmits a fourth sub-channel format PPDU 440 to the STA4 through a fourth sub-channel band. A GI for transmission of the data field of the fourth sub-channel format PPDU 440 may be a long GI.

As described above, the MIMO-OFDMA format PPDU supporting MIMO-OFDMA transmission is primarily characterized in that the PSDU 400 must have the same transmission time. In general, an L-LTF, an L-SIG, an HEW-SIG, an H-STF, an H-LTF, and an H-SIG may be transmitted on an OFDM symbol of 4 us by using a GI having a duration of 0.8 us.

The PSDU (or data field) 470 may be transmitted on an OFDM symbol by using a GI of various durations such as 0.8 us (LGI), 0.4 us (SGI), 1.2 us (DGI), etc.

In MIMO-OFDMA transmission according to the embodiment of the present invention, a transmission time of the PSDU 470 transmitted through each sub-channel band and an end time of the PSDU 470 need to be set to be equal to each other.

As described above, the number of H-LTFs 450 may vary depending on the number of spatial streams for transmitting the PPDU through each sub-channel band. Therefore, in order to equally set the transmission time of the PSDU 470 included in the sub-channel format PPDU transmitted through each sub-channel bandwidth, the number of H-LTFs 450 may be set equally for each of a plurality of sub-channel format PPDUs included in the MIMO-OFDMA format PPDU.

As a first method for equally setting the number of H-LTFs 450 included in each of the plurality of sub-channel formats PPDUs, the number of spatial streams for transmission of sub-channel format PPDUs transmitted respectively through a plurality of sub-channel bands may be set equally. That is, the number of spatial streams for transmitting the sub-channel format PPDU may be set equally always when performing MIMO-OFDMA transmission. When using this method, the number of available spatial streams may be limited if a specific STA supports only spatial streams which are relatively small in number in comparison with other STAs among receiving STAs when the AP transmits data on the basis of MIMO-OFDMA transmission.

As a second method for equally setting the number of H-LTFs 450 in the spatial stream, the number of H-LTFs 450 included in the PPDU may be set on the basis of a maximum value of the number of spatial streams for the sub-channel format PPDU.

That is, the number of H-LTFs 450 is not determined according to the actual number of spatial streams for transmission of the sub-channel format PPDU. The number of H-LTFs 450 of another sub-channel format PPDU transmitted in another sub-channel bandwidth may be determined on the basis of the number of H-LTFs 450 included in the sub-channel format PPDU transmitted through the greatest number of spatial streams. As a method of equally setting an end time of the PSDH 400 in the plurality of sub-channel format PPDUs, a boundary between OFDM symbols may be aligned.

Figure 5:
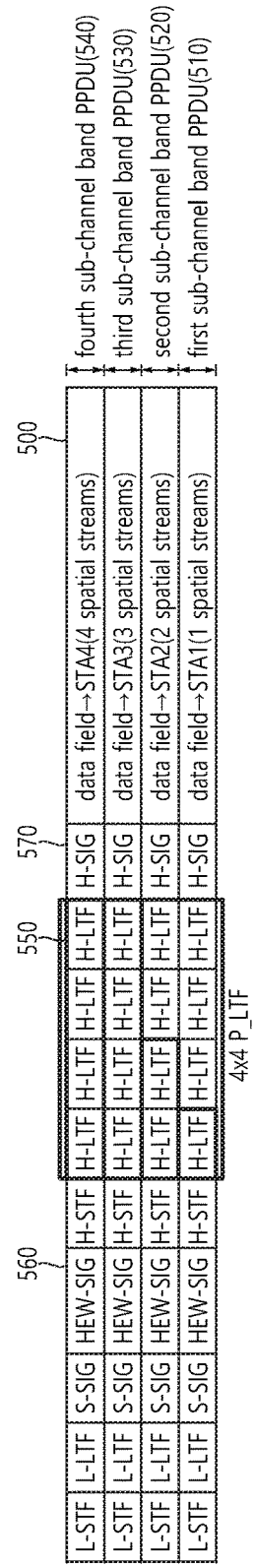
FIG. 5 is a concept view illustrating a PPDU supporting MIMO-OFDMA according to an embodiment of the present invention.

FIG. 5 is a concept view illustrating a PPDU supporting MIMO-OFDMA according to an embodiment of the present invention.

Referring to FIG. 5, an AP may transmit a sub-channel format PPDU to each of an STA1, an STA2, and STA3, and an STA4 respectively through a plurality of sub-channel bandwidths.

The AP transmits a first sub-channel format PPDU 510 to the STA1 through a first sub-channel band. The first sub-channel format PPDU 510 may be transmitted through one spatial stream.

The AP transmits a second sub-channel format PPDU 520 to the STA2 through a second sub-channel band. The second sub-channel format PPDU 520 may be transmitted through two spatial streams.

The AP transmits a third sub-channel format PPDU 530 to the STA3 through a third sub-channel band. The third sub-channel format PPDU 530 may be transmitted through three spatial streams.

The AP transmits a fourth sub-channel format PPDU 540 to the STA4 through a fourth sub-channel band. The fourth sub-channel format PPDU 540 may be transmitted through four spatial streams.

As described above, the number of H-LTFs 550 of a different sub-channel format PPDU transmitted in a different sub-channel bandwidth may be determined on the basis of the number of H-LTFs 550 included in the sub-channel format PPDU transmitted through the greatest number of spatial streams.

In case of FIG. 5, the number of H-LTFs 550 included in different sub-channel formats PPDUs 510, 520, and 530 transmitted through different sub-channel bands may be determined on the basis of four H-LTFs 550 included in the fourth sub-channel format PPDU 540 transmitted through four spatial streams in the fourth sub-channel band. That is, the number of H-LTFs 550 included in the first sub-channel format PPDU 510, the second sub-channel format PPDU 520, and the third sub-channel format PPDU 530 may be determined to 4.

A transmission start time of a plurality of sub-channel format PPDUs transmitted respectively through a plurality of sub-channels may be set equally on the basis of this method.

If the H-LTF 550s are transmitted in an overlapping manner on the basis of the plurality of spatial streams through the plurality of sub-channel bands, a matrix for ensuring orthogonality between the H-LTFs 550 transmitted through the plurality of sub-channel bands may be applied.

The matrix for ensuring the orthogonality between the H-LTFs 550 may be multiplied to an H-LTF sequence on a time-spatial domain. Equation 1 below shows a 4×4 matrix and 8×8 matrix for ensuring the orthogonality between the H-LTFs 550.

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \langle \text{Equation 1} \rangle$$

$$P_{8\times 8} = \begin{bmatrix} P_{4\times 4} & P_{4\times 4} \\ P_{4\times 4} & -P_{4\times 4} \end{bmatrix}$$

Referring to Equation 1, a 4×4 matrix $P_{4\times 4}$ may be applied to transmission of four H-LTFs 550 transmitted through four sub-channel bands as shown in FIG. 5. An 8×8 matrix $P_{8\times 8}$ may be applied to transmission of 8 H-LTFs transmitted through 8 sub-channel bands.

In MIMO-OFDMA transmission, each STA must know information regarding the number of spatial streams for transmitting the PSDU 550 to decode the PSDU 500 transmitted through an allocated sub-channel band.

If the STA knows the number of spatial streams transmitted through a sub-channel band, the number of H-LTFs 550 included in the sub-channel format PPDU transmitted through the spatial stream may be known. The STA may perform channel estimation on the basis of the H-LTF 550 received through the sub-channel format PPDU and may perform decoding on the PPDU.

Instead of determining the number of H-LTFs 550 according to the number of actual spatial streams as described above, the number of H-LTFs 550 included in each of a plurality of sub-channel format PPDUs may be determined according to a maximum value of the number of spatial streams for the plurality of sub-channel format PPDUs transmitted respectively through the plurality of sub-channel bands. In this case, the STA may require additional information for knowing the number of H-LTFs 550 included in the sub-channel format PPDU transmitted through a sub-channel bandwidth allocated for decoding of the sub-channel format PPDU. Various methods may be used in order for the STA to obtain information regarding the number of H-LTFs 550 included in the sub-channel format PPDU.

As a first method for delivering the number of H-LTFs 550 included in the sub-channel format PPDU, the AP may transmit information regarding the number of H-LTFs 550 included in the sub-channel format PPDU to the STA through the HEW-SIG 560 in addition to the actual number of spatial streams used to transmit the sub-channel format PPDU. That is, the HEW-SIG 560 may include the information regarding the number of H-LTFs 550 included in the sub-channel format PPDU.

As a second method for delivering the number of H-LTFs 550 included in the sub-channel format PPDU, the AP may transmit information regarding the actual number of spatial streams used for transmission of each of the plurality of sub-channel format PPDUs to each of the plurality of STAs through the HEW-SIG 560. That is, the HEW-SIG 560 may include information regarding the actual number of spatial streams used for transmission of the sub-channel format PPDU to each of the plurality of STAs (or each of the sub-channel bands). The STA may know the number of H-LTFs 550 included in the sub-channel format PPDU transmitted to the STA on the basis of the information regarding the actual number of spatial streams used for transmission of each of the plurality of sub-channel format PPDUs. More specifically, the STA may determine the number of H-LTFs 550 included in the sub-channel format PPDU transmitted to the STA on the basis of the maximum value of the number of spatial streams used in each of the sub-channel band.

Table 1 below shows a sub-field included in the HEW-SIG 560.

TABLE 1

| Fields | bits | description |
| --- | --- | --- |
| Group ID | 6 bits | Set to the value of the TXVECTROR parameter Group_ID for MIMO-OFDMA. |
| BW | 8 bits | The number of channel bandwidth for user u is indicated at user position. Set to 0 for 0 MHz, for 20 MHz, 2 for 40 MHz, 3 for 80 MHz. |
| Nsts | 8 bits | The number of space-time stream (spatial stream) for user u is indicated. |
| Coding | 4 bits | Inidcate either BCC or LDPC for user u. |
| LDPC Extra OFDM symbol | 1 bit | Indicate if the LDPC PPDU encoding process results in an extra OFDM symbol or not. |
| STBC | 1 bit | Inidicate if a space time block coding is used or not. |
| Beam-formed | 1 bit | Indicate if a beamforming sterling matrix is applied to the waveform or not. |
| GI type | 2 bits | Inidcate a guard interval. |
| Reserved | 3 bits | |
| CRC | 8 bits | |
| Tail | 6 bits | |
| | 48 bits | |

Table 2 below shows a sub-field included in the H-SIG 570.

TABLE 2

| Field | bits | description |
| --- | --- | --- |
| length | 16 bits | Indicate a length of PSDU |
| MCS | 4 bits | Indicate a MCS of PSDU |
| Tail | 6 bits | |
| | 26 bits | |

The H-SIG 570 may further include a GI type field and a GI disambiguous field described below. The H-SIG 570 and the HEW-SIG 560 may be implemented as one signal field. Further, a sub-field included in each of the H-SIG 570 and the HEW-SIG 560 may be various combinations of a sub-field of the HEW-SIG 560 exemplifed in Table 1 and a sub-field of the H-SIG 570 exemplified in Table 2.

A group ID field included in the HEW-SIG 560 may include group ID information for grouping of STAs. The STAs may receive a group ID for the respective STAs from the AP through the group ID field. The STAs may acquire user position information corresponding to each group ID.

TABLE 3

| | Group ID | | | | | | |
| --- | --- | --- | --- | --- | --- | --- | --- |
| | ... | 10 | 11 | 12 | 13 | 14 | 15 | ... |
| User position | ... | 1 | 2 | 3 | 4 | 3 | 2 | ... |

Table 3 discloses a group ID received by an STA from an AP and a user position corresponding to the group ID.

Upon receiving the group ID of the STA through the HEW-SIG 560, the STA may perform the following operation. For example, if a value of the group ID of the HEW-SIG 560 is 12 in the sub-channel format PPDU received by the STA, a user position may correspond to 3. The STA may obtain information regarding a size of a downlink transmission bandwidth for the STA on the basis of a bit corresponding to a bandwidth field user position 3 of the HEW-SIG 560. That is, on the basis of various methods in addition thereto, the STA may acquire the information regarding the downlink transmission bandwidth from the AP on the basis of information on the group ID and the user position.

The STA may obtain information regarding the number of spatial streams for the STA in the Nsts field of the HEW-SIG 560.

Figure 6:
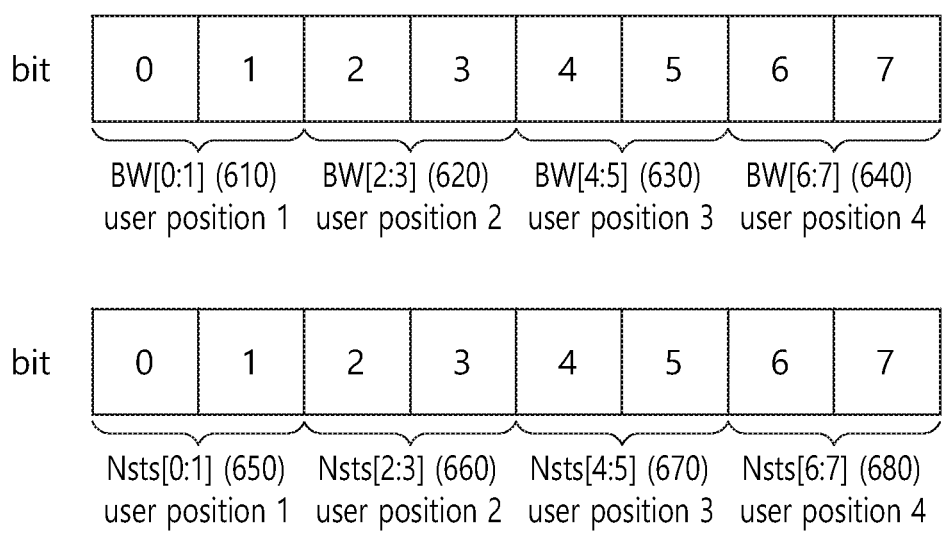
FIG. 6 is a concept view illustrating an HEW-SIG field according to an embodiment of the present invention.

FIG. 6 is a concept view illustrating an HEW-SIG field according to an embodiment of the present invention.

The upper part of FIG. 6 shows a bandwidth field.

Referring to the upper part of FIG. 6, 8 bits constituting the bandwidth field may correspond to values of a user position in unit of 2 bits. For example, a BW[0:1] 610 corresponding to $1^{st}$ and $2^{nd}$ bits of the bandwidth field may correspond to bandwidth size information when a user position value of an STA is 1. A BW[2:3] 620 corresponding to $3^{rd}$ and $4^{th}$ bits of the bandwidth field may correspond to bandwidth size information when the user position value of the STA is 2. A BW[4:5] 630 corresponding to $5^{th}$ and $6^{th}$ of the bandwidth field may correspond to bandwidth size information when the user position value of the STA is 3. A BW[6:7] 640 corresponding to $7^{th}$ and $8^{th}$ bits of the bandwidth field may correspond to bandwidth size information when the user position value of the STA is 4. That is, one bandwidth field may include bandwidth information regarding each of the four STAs corresponding to different user positions.

If a value of two bits included in the bandwidth field is 0 (00), this may indicate a bandwidth of 0 MHz. If the value of the two bits included in the bandwidth field is 1 (01), this may indicate a bandwidth of 20 MHz. If the value of the two bits included in the bandwidth field is 2 (10), this may indicate a bandwidth of 40 MHz. If the value of the two bits included in the bandwidth field is 3 (11), this may indicate a bandwidth of 80 MHz. 0 MHz may indicate that the sub-channel format PPDU is not transmitted by the AP to the STA.

The lower part of FIG. 6 shows an Nsts field.

Referring to the lower part of FIG. 6, 8 bits constituting the Nsts field may correspond to values of a user position in unit of 2 bits. For example, an Nsts[0:1] 650 corresponding to $1^{st}$ and $2^{nd}$ bits of the Nsts field may correspond to information regarding the number of spatial streams when a user position value of an STA is 1. An Nsts[2:3] 660 corresponding to $3^{rd}$ and $4^{th}$ bits of the Nsts field may correspond to the information regarding the number of spatial streams when the user position value of the STA is 2. An Nsts[4:5] 670 corresponding to $5^{th}$ and $6^{th}$ of the Nsts field may correspond to the information regarding the number of spatial streams when the user position value of the STA is 3. An Nsts[6:7] 680 corresponding to $7^{th}$ and $8^{th}$ bits of the Nsts field may correspond to the information regarding the number of spatial streams when the user position value of the STA is 4. That is, one Nsts field may include information regarding the number of spatial streams for the respective four STAs corresponding to different user positions.

If a value of two bits is 0 (00), this may indicate one spatial stream. If the value of the two bits is 1 (01), this may indicate two spatial streams. If the value of the two bits is 2 (10), this may indicate three spatial streams. If the value of the two bits is 3 (11), this may indicate four spatial streams.

In the aforementioned example, if a value of a group ID of an STA is 12 and a user position of the STA is 3, the STA may obtain channel band information for a sub-channel format PPDU transmitted to the STA and information regarding the number of spatial streams transmitted to the STA on the basis of a bit corresponding to the user position 3 in the bandwidth field and the Nsts field. That is, the STA may obtain a size of a channel bandwidth of a sub-channel format PPDU to be received and the number of spatial streams for transmitting the sub-channel format PPDU through a bit corresponding to the BW[4:5] 630 and the Nsts[4:5] 670. If the BW[4:5] is 01 and the Nsts[4:5] 670 is 10, the STA may receive a sub-channel format PPDU through three spatial streams in a sub-channel band of 20 MHz.

More specifically, if the group ID of the STA is 12 and the user position is 1, the STA may obtain a size of a channel band for a sub-channel format PPDU to be received and information regarding the number of spatial streams for transmitting the sub-channel format PPDU through a bit corresponding to the BW[0:1] 610 and the Nsts[0:1] 650.

If the group ID of the STA is 12 and the user position is 2, the STA may obtain a size of a channel band for a sub-channel format PPDU to be received and information regarding the number of spatial streams for transmitting the sub-channel format PPDU through a bit corresponding to the BW[2:3] 620 and the Nsts[2:3] 660.

If the group ID of the STA is 12 and the user position is 4, the STA may obtain a size of a channel band for a sub-channel format PPDU to be received and information regarding the number of spatial streams for transmitting the sub-channel format PPDU through a bit corresponding to the BW[6:7] 640 and the Nsts[6:7] 680.

For example, if the BW[0:1] 610 is 1, the BW[2:3] 620 is 1, the BW[4:5] 630 is 0, and the BW[6:7] 640 is 2, then an STA1 corresponding to a user position 1 receives a sub-channel format PPDU through a 20 MHz sub-channel band. An STA2 corresponding to a user position 2 may receive the sub-channel format PPDU through the 20 MHz sub-channel band corresponding to a higher frequency than the 20 MHz sub-channel band allocated to the STA2. An STA3 corresponding to a user position 3 knows that there is no sub-channel format PPDU to be received. An STA4 corresponding to a user position 4 may receive the sub-channel format PPDU through the 40 MHz sub-channel band located at a higher frequency than the 20 MHz sub-channel band allocated to the STA2.

If the BW[4:5] 630 is not 0, the STA4 may receive the sub-channel format PPDU through the 40 MHz sub-channel band located at a higher frequency band than the sub-channel band allocated to the STA3.

In addition thereto, a method of determining a bandwidth for each of a plurality of STAs in a bandwidth field on the basis of a group ID and a user position of an STA and/or a method of determining the number of spatial streams for each of the plurality of STAs in the Nsts field on the basis of the group ID and the user position of the STA may be used in various manners.

Hereinafter, MU MIMO-OFDMA transmission is disclosed according to an embodiment of the present invention.

For example, if an SDMA (MU (multi-user) MIMO) function is added to MIMO-OFDMA, different sub-channel formats PPDUs may be transmitted to different STAs at one sub-channel band.

Figure 7:
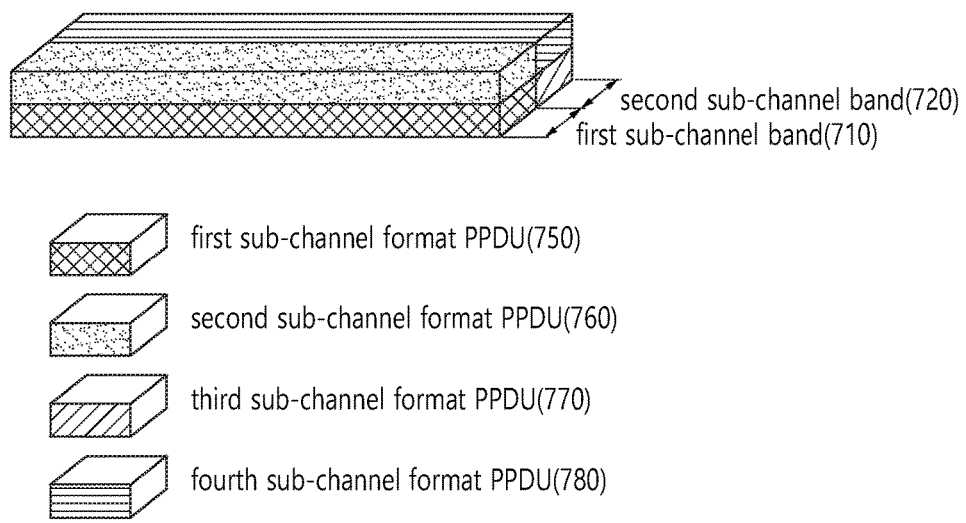
FIG. 7 is a concept view illustrating MU MIMO-OFDMA transmission according to an embodiment of the present invention.

FIG. 7 is a concept view illustrating MU MIMO-OFDMA transmission according to an embodiment of the present invention.

Referring to FIG. 7, different sub-channel format PPDUs may be transmitted to a plurality of STAs in one sub-channel band. For convenience of explanation, it is assumed that the entire channel band includes a first sub-channel band 710 and a second sub-channel band 720.

An AP may transmit a first sub-channel format PPDU 750 to an STA1 and a second sub-channel format PPDU 760 to an STA2 through the first sub-channel band 710 on the basis of an MU-MIMO transmission method.

The AP may transmit a third sub-channel format PPDU 770 to an STA3 and a fourth sub-channel format PPDU 780 to an STA4 through the second sub-channel band 720 on the basis of the MU-MIMO transmission method.

MU-MIMO may apply precoding to a plurality of antennas for spatial orthogonality between sub-channel format PPDUs directed to a plurality of destination terminals (e.g., destination STAs) through the same sub-channel band.

According to an embodiment of the present invention, an AP may transmit a sub-channel format PPDU on the basis of various transmission methods. Information regarding the method of transmitting the sub-channel format PPDU may be included in a field of the sub-channel format PPDU.

For example, an HEW-SIG of the sub-channel format PPDU may include information regarding the method of transmitting the sub-channel format PPDU. For example, the HEW-SIG may include an HEW PPDU type field as a sub-field. The HEW PPDU type field may indicate one transmission method used when the sub-channel format PPDU is transmitted among SU-MIMO, MU-MIMO, MIMO-OFDMA, and MU-MIMO-OFDMA. More specifically, if a value of the HEW PPDU type field is 0, it may indicate that the sub-channel format PPDU is transmitted based on SU-MIMO. If the value of the HEW PPDU type field is 1, it may indicate that the sub-channel format PPDU is transmitted based on MU-MIMO. If the value of the HEW PPDU type field is 2, it may indicate that the sub-channel format PPDU is transmitted based on MIMO-OFDMA. If the value of the HEW PPDU type field is 3, it may indicate that the sub-channel format PPDU is transmitted based on MU-MIMO-OFDMA.

If the value of the HEW PPDU type field is 2 and the value of the HEW PPDU type field is 3, a bandwidth field which is a sub-field of the HEW-SIG may be interpreted differently.

The bandwidth field is 8 bits, and may indicate a bandwidth for each of 4 STAs in unit of 2 bits. As described above, 00(0) may indicate a sub-channel band of 0 MHz, 01(1) may indicate a sub-channel band of 20 MHz, 10(2) may indicate a sub-channel band of 40 MHz, and 11(3) may indicate a sub-channel band of 80 MHz.

If the HEW PPDU type is 2, as described above, respective sub-channel bands may be bands not overlapping with each other.

If the HEW PPDU type is 3, sub-channel bands for transmitting respective PPDUs may be determined on the basis of a primary 20 MHz channel. If the HEW PPDU type is 3, a channel bandwidth for PPDU transmission may overlap.

Figure 8:
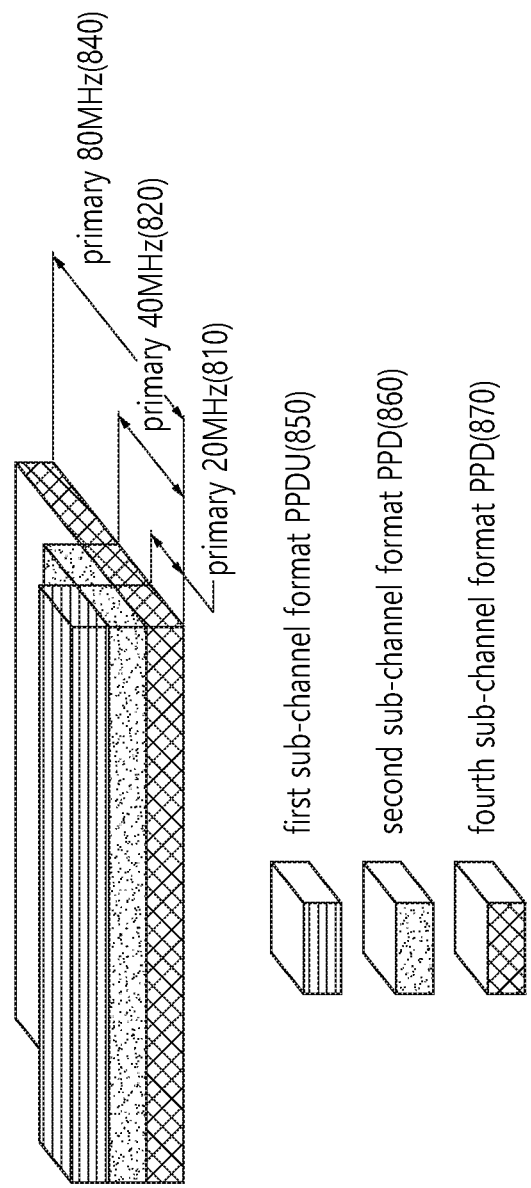
FIG. 8 is a concept view illustrating MU MIMO-OFDMA transmission according to an embodiment of the present invention.

FIG. 8 is a concept view illustrating MU MIMO-OFDMA transmission according to an embodiment of the present invention.

In FIG. 8, it is disclosed a case where BW[0:1] is 1, BW[2:3] is 2, BW[4:5] is 0, and BW[6:7] is 3 in a bandwidth field. If a value of the bandwidth field is 1, it may imply a 20 MHz sub-channel band. If the value of the bandwidth field is 2, it may imply a 40 MHz sub-channel band. If the value of the bandwidth field is 0, it may imply a 0 MHz sub-channel band. If the value of the bandwidth field is 3, it may imply an 80 MHz sub-channel band. Referring to FIG. 8, it is shown a correlation among the primary 20 MHz channel, the primary 40 MHz channel, and the primary 80 MHz channel.

An STA1 corresponding to a first user position may receive a first sub-channel format PPDU 850 through a primary 20 MHz channel 810 from an AP.

An STA2 corresponding to a second user position may receive a second sub-channel format PPDU 860 through a primary 40 MHz channel 820 including a primary 20 MHz channel allocated to the STA1 from the AP.

An STA3 corresponding to a third user position may know that there is no PPDU to be received.

An STA4 corresponding to a fourth user position may receive a fourth sub-channel format PPDU 870 through a primary 80 MHz channel 840 including a primary 40 MHz channel allocated to the STA2 from the AP.

Figure 9:
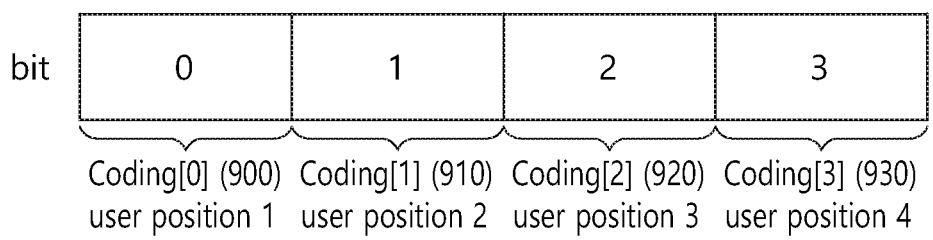
FIG. 9 is a concept view illustrating a coding field according to an embodiment of the present invention.

FIG. 9 is a concept view illustrating a coding field according to an embodiment of the present invention.

Referring to FIG. 9, a coding field included in an HEW-SIG may consist of 4 bits.

Each of the bits constituting the coding field may include information regarding a coding method for a PSDU to be transmitted to an STA corresponding to each user position. For example, binary convolutional codes (BCC) or low density parity check (LDPC) may be indicated according to whether each of the bits constituting the coding field is 1 or 0.

A coding[0] 900 which is a first bit of the coding field may include information regarding a coding scheme of a PSDU transmitted to an STA corresponding to a user position 1.

A coding[1] 910 which is a second bit of the coding field may include information regarding a coding scheme of a PSDU transmitted to an STA corresponding to a user position 2.

A coding[2] 920 which is a third bit of the coding field may include information regarding a coding scheme of a PSDU transmitted to an STA corresponding to a user position 3.

A coding[3] 930 which is a fourth bit of the coding field may include information regarding a coding scheme of a PSDU transmitted to an STA corresponding to a user position 4.

The AP may transmit information regarding a coding scheme of a PSDU transmitted through each sub-channel band through a 4-bit coding field. A different coding scheme may be applied to the PSDU transmitted through the sub-channel band.

Figure 10:
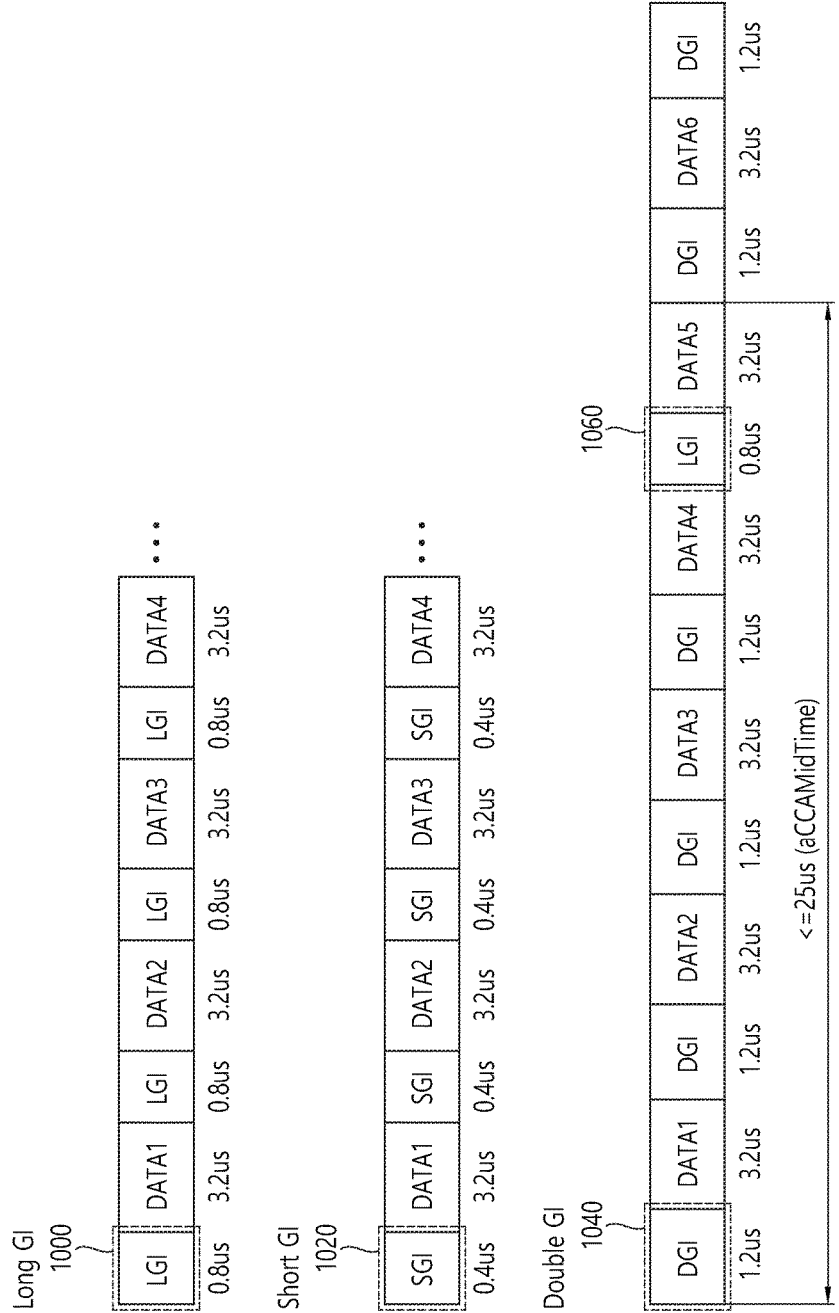
FIG. 10 is a concept view illustrating a type of a guard interval used in a PSDU according to an embodiment of the present invention.

FIG. 10 is a concept view illustrating a type of a guard interval used in a PSDU according to an embodiment of the present invention.

In FIG. 10, the type of the guard interval used in the PSDU is disclosed.

The upper part of FIG. 10 discloses a case of using an LGI 1000 in the PSDU. When the LGI 1000 is used in the PSDU, one OFDM symbol may include a guard interval of 0.8 us and a data interval of 3.2 us.

The middle part of FIG. 10 discloses a case of using an SGI 1020 in the PSDU. When the SGI 1020 is used in the PSDU, one OFDM symbol may include a guard interval of 0.4 us and a data interval of 3.6 us. When the SGI 1020 is used in the PSDU, the guard interval is more decreased than the LGI, and thus transmission coverage is decreased, but data transmission efficiency may be increased.

The lower part of FIG. 10 discloses a case of using a DGI 1040 in the PSDU. When the DGI 1040 is used in the PSDU, one OFDM symbol may include a guard interval of 1.2 us and a data interval of 3.2 us. When the DGI 1040 is used in the PSDU, the guard interval is more increased than the LGI, and thus transmission coverage is decreased, but data transmission efficiency may be decreased.

When the DGI 1040 is used in the PSDU, legacy STAs which perform mid-packet clear channel assessment (CCA) may not be able to discover an OFDM symbol including the DGI.

The mid-packet CCA is a CCA mechanism for a secondary channel. The mid-packet CCA may measure a guard interval of OFDM symbols during a PIFS time duration (25 us in case of a 5 GHz frequency band). If a guard interval of 0.8 us or 0.4 us is detected to be greater than or equal to specific signal strength in the mid-packet CCA, it may be determined that a corresponding channel is busy.

However, in case of using the DGI 1040, the guard interval is 1.2 us. Therefore, the legacy STAs which perform the mid-packet CCA cannot detect the guard interval 0.8 us or 0.4 us. As a result, the STA may determine that the secondary channel is in an idle state even though the secondary channel is actually in use.

In order to solve this problem, according to an embodiment of the present invention, if the DGI 1040 is used in the PSDU, the PSDU may be transmitted through an OFDM symbol consisting of an LGI (or SGI) 1060 at least one time within a time interval of a PIFS. When using this method, legacy STAs which perform the mid-packet CCA may detect the LGI (or SGI) 1060 at least one time within the time interval of the PIFS. Therefore, if the DGI 1040 is used in the PSDU, the legacy STA is able to accurately determine a state of a channel.

That is, each of the plurality of sub-channel format PPDUs may include the PSDU, and a guard interval used for transmission of the PSDU may be one of an LGI, an SGI, and a GI combination. In this case, the GI combination may be a combination of a DGI and one GI between the LGI and the SGI.

In the GI combination, one GI between the LGI and the SGI may construct at least one OFDM symbol among a plurality of OFDM symbols corresponding to a point coordination function (PCF) inter frame symbol (PIFS) interval in entire OFDM symbols for transmission of the PSDU. In the GI combination, the DGI may construct the remaining OFDM symbols other than the at least one OFDM symbol for one GI between the LGI and the SGI.

Figure 11:
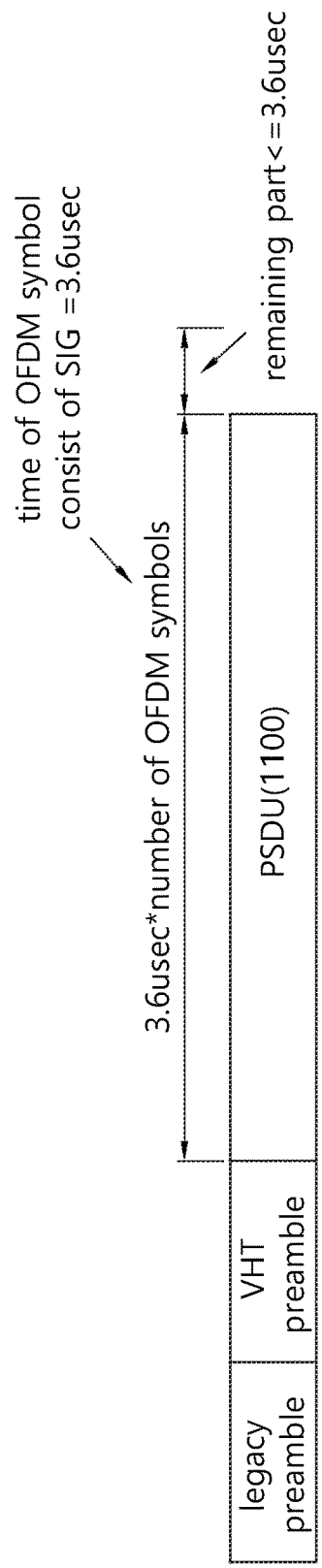
FIG. 11 is a concept view illustrating time synchronization between sub-channel format PPDUs according to an embodiment of the present invention.

FIG. 11 is a concept view illustrating time synchronization between sub-channel format PPDUs according to an embodiment of the present invention.

A signal field such as an HEW-SIG or H-SIG field may include a GI type field and a GI disambiguation field.

Table 4 shows a GI type field.

TABLE 4

| GI disambiguous field(bits) | description |
|---|---|
| 00 | LGI |
| 01 | SGI |
| 10 | DGI |
| 11 | reserved |

Table 5 indicates a GI disambiguation field.

TABLE 5

| GI disambiguous field(bits) | description |
|---|---|
| 0 | It is not mapped to the boundary of a 4us OFDM symbol consisting of LGI. |
| 1 | It is set to 1 for indication that the timing of the last OFDM symbol included in the PSDU using SGI is mapped to the timing of the OFDM symbol included in the PSDU using Long GI. It is set to 2 for indication that an OFDM symbol timing using a double GI of the PSDU is mapped to 4us Long GI symbol boundary. |

If the GI type field and the GI disambiguous field are included in the HEW-SIG, the PSDU transmitted through each of the plurality of sub-channel may use the same guard interval.

In order for the guard intervals of the PSDUs transmitted respectively through the plurality of sub-channel bands to use different values, the GI type field and the GI disambiguous field may be included in the H-SIG field located in a tail part of the HEW-SIG to deliver user specific information.

Referring to FIG. 11, when transmitting a PSDU using an SGI or a DGI, a last OFDM symbol of the PSDU may not be matched to a boundary of a 4 us OFDM symbol.

When transmitting a PSDU 1100 using the SGI, the PSDU may be allocated with a multiple of 3.6 us on a time resource. When transmitting a PSDU using the LGI, the PSDU may be allocated with a multiple of 4 us on the time resource. Therefore, if guard intervals of different lengths are used in a plurality of sub-channel format PPDUs, an end boundary of the PPDU may not be matched.

The GI disambiguous field may be used to indicate whether a transmission end timing of a last OFDM symbol for transmitting the PSDU using the SGI or the DGI is mapped with a boundary of an OFDM symbol for transmitting the PSDU using the LGI. An additional bit such as a padding bit may be used for mapping of a boundary between OFDM symbols using different GIs. Alternatively, the GI disambiguous field may also be used to explicitly indicate the number of OFDM symbols for transmitting the PSDU using the SGI or the DGI.

The GI type field and the GI disambiguation may be expressed by Table 6 below.

TABLE 6

| GI type field(bits) | GI disambiguation |
|---|---|
| 00(LGI) | reserved |
| 01(SGI) | It is set for indicating that an OFDM symbol time using a Short GI of the PSDU is mapped to 4us Long GI symbols boundary. Otherwise it is set to 0. |
| 10(DGI) | It is set for indicating that an OFDM symbol time using a Double GI of the PSDU is mapped to 4us Long GI symbols boundary. |
| 11 | reserved |

That is, according to the GI type, in case of using the LGI, OFDM symbol timing consisting of the SGI or the DGI can be adjusted to be mapped to a boundary of a 4 us OFDM symbol consisting of the LGI.

Figure 12:
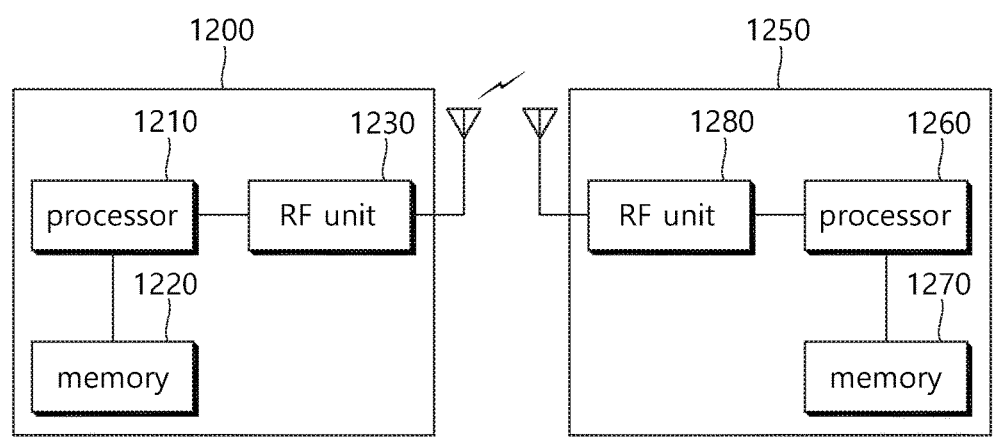
FIG. 12 is a block diagram illustrating a wireless device according to an embodiment of the present invention.

FIG. 12 is a block diagram illustrating a wireless device according to an embodiment of the present invention.

Referring to FIG. 12, a wireless device 1200 is an STA capable of implementing the aforementioned embodiment, and may be an AP 1250 or a non-AP STA (or STA) 1200.

The STA 1200 includes a processor 1210, a memory 1220, and a radio frequency (RF) unit 1230.

The RF unit 1230 may be coupled to the processor 1210 to transmit/receive a radio signal.

The processor 1210 may implement the functions, procedures, and/or methods proposed in the present invention. For example, the processor 1210 may be implemented to perform an operation of the wireless device according to the aforementioned embodiment of the present invention. The processor may perform the operation of the STA disclosed in the embodiment of FIG. 3 to FIG. 11.

For example, the processor 1210 may receive a sub-channel format PPDU regarding the STA and included in an MIMO-OFDMA format PPDU.

Further, the processor 1210 may be implemented to receive group identifier information, bandwidth information, and Nsts information included in a signal field, to determine whether a sub-channel format PPDU is received on the basis of the group identifier information, to obtain information regarding a channel band allocated to a sub-channel format PPDU for the STA on the basis of the bandwidth information, and to obtain information regarding the number of spatial streams allocated to the sub-channel format PPDU for the STA on the basis of the Nsts information.

The AP 1250 includes a processor 1260, a memory 1270, and an RF unit 1280.

The RF unit 1280 may be coupled to the processor 1260 to transmit/receive a radio signal.

The processor 1260 may implement the functions, procedures, and/or methods proposed in the present invention. For example, the processor 1260 may be implemented to perform an operation of the wireless device according to the aforementioned embodiment of the present invention. The processor may perform the operation of the STA disclosed in the embodiment of FIG. 3 to FIG. 11.

For example, the processor 1260 may be implemented to generate an MIMO-OFDMA format PPDU and to transmit the MIMO-OFDMA format PPDU to the plurality of STAs. The MIMO-OFDMA format PPDU may include a plurality of sub-channel format PPDUs which are time synchronized. The plurality of sub-channel format PPDUs may be transmitted respectively to the plurality of STAs respectively through a plurality of sub-channel bands. The number of training fields for MIMO transmission and included respectively in the plurality of sub-channel format PPDUs may be identical.

The processors 1210 and 1260 may include application-specific integrated circuits (ASICs), other chipsets, logical circuits, data processing devices, and/or converters for mutually converting a baseband signal and a radio signal. The memories 1220 and 1270 may include a read-only memory (ROM), a random access memory (RAM), a flash memory, a memory card, a storage medium and/or other storage devices. The RF units 1230 and 1280 may include at least one antenna to transmit and/or receive the radio signal.

When the embodiment is implemented by software, the above scheme may be implemented by a module (procedure, function, and the like) to perform the above function. The module is stored in the memories 1220 and 1270 and may be implemented by the processors 1210 and 1260. The memories 1220 and 1270 may be installed inside or outside the processors 1210 and 1260, and may be coupled to the processors 1210 and 1260 through various known means.

What is claimed is:

1. A method of transmitting data to a plurality of stations (STAs) in a wireless local area network (LAN), the method comprising:
   generating, by an access point (AP), a physical layer protocol data unit (PPDU) comprising a plurality of sub-channel format PPDUs for the plurality of STAs,
   wherein the plurality of sub-channel format PPDUs are to be transmitted through a plurality of sub-channel bands,
   wherein each of the plurality of sub-channel format PPDUs comprises a signal field and at least one training field for multiple input multiple output (MIMO) channel estimation transmission,
   wherein the generating comprises determining, by the AP, the number of the at least one training field based on a maximum value of the number of spatial streams which are allocated to each frequency band in the plurality of sub-channel bands,
   wherein each sub-channel format PPDU has a same number of training fields for the MIMO channel estimation, and
   wherein the signal field indicates the number of the at least one training field so that plurality of STAs know the number of the at least one training field; and
   transmitting, by the AP, the generated PPDU to the plurality of STAs.

2. The method of claim 1, wherein the number of the at least one training field is determined to be one of 1, 2, 4, 6, 8.

3. The method of claim 1,
   wherein the signal field further indicates group identifier information, bandwidth information, and spatial stream information,
   wherein the group identifier information comprises identifier information for indicating the plurality of STAs,
   wherein the bandwidth information comprises information regarding a channel bandwidth allocated to each of the plurality of sub-channel format PPDUs, and
   wherein the spatial stream information comprises information regarding the number of spatial streams for each of the plurality of sub-channel format PPDU.

4. The method of claim 1,
   wherein each of the plurality of sub-channel format PPDU comprises a PLCP service data unit (PSDU),
   wherein a guard interval (GI) used for transmission of the PSDU is one of a long guard interval (LGI), a short guard interval (SGI), and a GI combination, and
   wherein the GI combination is a combination of a double guard interval (DGI) and one GI between the LGI and the SGI.

5. The method of claim 4,
   wherein the GI is used in at least one OFDM symbol among a plurality of OFDM symbols corresponding to a point coordination function (PCF) inter frame symbol (PIFS) interval in entire OFDM symbols for transmission of the PSDU, and
   wherein the DGI is used in the remaining OFDM symbols other than the at least one OFDM symbol among the entire symbols.

6. An access point (AP) for transmitting data to a plurality of stations (STAs) in a wireless local area network (LAN), the AP comprising:
   a transceiver, including at least one antenna, transmitting and receiving a radio signal; and
   a processor operatively coupled to the transceiver, wherein the processor:
   generates a physical layer protocol data unit (PPDU) comprising a plurality of sub-channel format PPDUs for the plurality of STAs,
   wherein the plurality of sub-channel format PPDUs are to be transmitted through a plurality of sub-channel bands,
   wherein each of the plurality of sub-channel format PPDUs comprises a signal field and at least one training field for multiple input multiple output (MIMO) channel estimation,
   wherein the processor generates the PPDU by determining the number of the at least one training field is determined based on a maximum value of the number of spatial streams which are allocated to each frequency band in the plurality of sub-channel bands,
   wherein each sub-channel format PPDU has a same number of training fields for the MIMO channel estimation,
   wherein the signal field indicates the number of the at least one training field so that plurality of STAs know the number of the at least one training field; and
   controls the transceiver to transmit the generated PPDU to the plurality of STAs.

7. The AP of claim 6, wherein the number of the at least one training field is determined to be one of 1, 2, 4, 6, 8.

8. The AP of claim 6,
   wherein the signal field further indicates group identifier information, bandwidth information, and spatial stream information,
   wherein the group identifier information comprises identifier information for indicating the plurality of STAs,
   wherein the bandwidth information comprises information regarding a channel bandwidth allocated to each of the plurality of sub-channel format PPDUs, and
   wherein the spatial stream information comprises information regarding the number of spatial streams for each of the plurality of sub-channel format PPDU.

9. The AP of claim 6,
   wherein each of the plurality of sub-channel format PPDU comprises a PLCP service data unit (PSDU),
   wherein a guard interval (GI) used for transmission of the PSDU is one of a long guard interval (LGI), a short guard interval (SGI), and a GI combination, and
   wherein the GI combination is a combination of a double guard interval (DGI) and one GI between the LGI and the SGI.

10. The AP of claim 9,
wherein the GI is used in at least one OFDM symbol among a plurality of OFDM symbols corresponding to a point coordination function (PCF) inter frame symbol (PIFS) interval in entire OFDM symbols for transmission of the PSDU, and
wherein the DGI is used in the remaining OFDM symbols other than the at least one OFDM symbol among the entire symbols.

* * * * *